Nov. 13, 1923.  1,474,024
B. S. COWLES
PISTON AND PISTON RING AND PROCESS OF MAKING THE SAME
Filed March 19, 1921
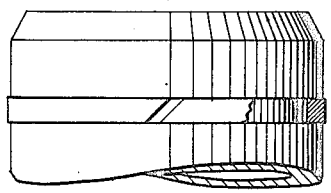
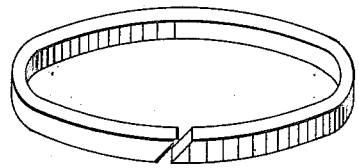
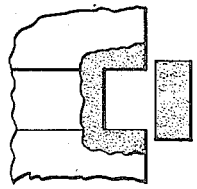  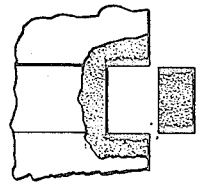
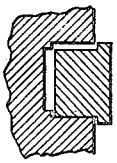
Inventor
Burton S. Cowles
By his Attorneys
Newell & Spencer Patented Nov. 13, 1923.

1,474,024

UNITED STATES PATENT OFFICE.

BURTON S. COWLES, OF WILKES-BARRE, PENNSYLVANIA.

PISTON AND PISTON RING AND PROCESS OF MAKING THE SAME.

Application filed March 19, 1921. Serial No. 453,692.

*To all whom it may concern:*

Be it known that I, BURTON S. COWLES, a citizen of the United States, residing at 80 South Washington St., Wilkes-Barre, Pennsylvania, have invented certain new and useful Improvements in Pistons and Piston Rings and Processes of Making the Same, of which the following is a clear, full, and exact description.

This invention relates to hydrocarbon motors.

More particularly the invention relates to pistons and piston rings for hydrocarbon motors and to a process of making these parts.

The pistons for hydrocarbon motors are ordinarily made of cast iron, and cast iron piston rings also are extensively used at the present time. When cast iron rings are used the present practice is to turn them up nearly to the width required, and then to grind them to a standard gauge. The grooves in the piston for the reception of the rings are ordinarily turned out to the required width. Only in very rare cases are the upper and lower surfaces of the grooves finished by grinding.

In fitting rings to pistons, the ideal condition is to have the sides of a ring fit closely against the side walls of the groove in the piston with just sufficient freedom of movement to allow the ring to expand without binding in the groove. The close fit of the ring in the grooves prevents the leakage of the gaseous mixture between the rings and the piston and enables the compression to be held in a reliable manner in the cylinders.

This ideal condition which is sought for by manufacturers of motors may be produced when the motor is first put into use, but ordinarily no longer obtains after the motor has been used for any considerable time. On account of the softness of cast iron the contact of the piston ring with the opposite sides of the groove in the piston caused by the explosions and the movement of the piston gradually compacts the opposite sides of the ring and the contacting surfaces of the groove so that the ring no longer fits closely in the groove. This results in leakage between the piston and ring and causes loss of compression and lack of power in the motor.

The principal objects of the present invention are to produce piston rings and pistons in which the sides of the rings and the side walls of the grooves will not be compacted in the manner described by long continued use and to devise a process of making such rings which will involve very little, if any, additional expense over the present cost of manufacture.

With these objects in view the invention comprises the piston ring and piston and the process of making the same, involving the novel features hereinafter described and particularly pointed out in the claims, the advantages of which will be readily understood and appreciated by those skilled in the art.

To avoid the compacting of the sides of a piston ring and the side walls of the groove in the piston for the reception of the ring, the inventor contemplates providing the sides of the ring and the side walls of the groove each with a layer of hardened metal. Preferably the sides of the ring and side walls of the groove are provided with these layers of hardened metal by compacting the sides of the ring and the side walls of the groove before the piston and ring are assembled. The compacting of the sides of the ring and the walls of the grooves may be performed in various ways, as by hammering, rolling, or burnishing the same. With the metal at the sides of the ring and the side walls of the groove hardened in this manner they will resist the compacting action ordinarily produced when the motor is in operation, and the ring will fit closely in the groove after the motor has been in operation for a very long period of time.

The invention will be clearly understood from the accompanying drawings and the following detailed description showing and describing one way in which the invention may be applied.

In the drawings—

Fig. 1 is a view in side elevation partly in section showing a piston of a hydrocarbon motor with a piston ring fitted in a groove in the piston;

Fig. 2 is a perspective view of the ring detached from the piston;

Fig. 3 is a view illustrating diagrammatically a piston ring and piston at one stage in the manufacture thereof in accordance with applicant's process; and Fig. 4 is a view similar to Fig. 3 illustrating a piston ring and piston at a later stage in the process of manufacture.

Fig. 5 is a detail sectional view of a piston ring and a portion of a piston illustrating the defects resulting from long continued use of these parts when made in the usual way.

In the manufacture of piston rings and pistons in accordance with the present process as preferably carried out, the pistons may be cast and finished in the usual manner except as to the formation or the finishing of the grooves in the piston. Also the piston rings may be cast and the inner and outer surfaces of the ring may be turned and finished in the usual manner. The grooves in the piston may be turned out to a predetermined width and the rings also may be given a predetermined width by turning the same down after casting.

In the operation of a hydrocarbon motor the impact of a piston ring with the side walls of the groove in the piston caused by the movement of the piston and the explosions of the cylinder tends to compact the metal at the contact points of the ring and piston as stated above. Where these parts are made of cast iron which is relatively soft, the sides of the ring and the side-walls of the groove in the piston are compacted to a very marked degree. This condition is illustrated in Fig. 5 of the drawings.

When such a condition as that illustrated in this figure exists, the gaseous mixture obviously will leak badly between the ring and the piston with the result that poor compression will be obtained and the motor will have relatively little power.

To obviate the production of a condition such as above described, applicant proposes to harden preferably both the lateral surfaces of piston rings and the side walls of the grooves formed in pistons for the reception of the rings. These surfaces are preferably hardened by subjecting the same to compression while the metal is cold, thereby compacting the metal to a greater or less depth. The metal may be compressed in various ways, as by hammering, rolling or burnishing the same with very little addition to the cost of manufacture. The hardening of the surfaces of piston rings while the metal is cold has the advantage over the usual case hardening process or any other process in which the iron is heated, in that the metal can be hardened with no danger of distorting or warping the rings as would often be done in a process requiring the heating of the rings.

To compensate for the widening of the grooves in the pistons and the narrowing of the rings produced by compression, the rings and the grooves are so formed that before the walls of the grooves and the sides of the rings are compressed, the rings are somewhat wider than the grooves as shown in Fig. 3 of the drawings, the stippled areas indicating sections respectively of a portion of a piston and of a ring. The walls of the grooves and the sides of the rings are then compressed so that the rings will fit accurately without binding in the grooves. Fig. 4 of the drawing illustrates a ring and groove after compression, the heavily stippled portions at the opposite sides of the ring and at the side walls of the groove indicating the compacting of the metal by pressure. During the compression of the surface portions of the metal, the parts may be formed, in the compressing operation, with smooth finished surfaces which will give a good even contact between groove and ring.

When the walls of the grooves and the sides of the rings are hardened by compression, the extent to which the parts are compressed may be varied as required to give the most satisfactory results. The amount of compression required may vary with the size and power of the motor and the conditions under which it is employed. For example, a compression of about five one thousandths (.005) of an inch for each side of the groove in a piston and for each side of a ring may be sufficient to give the proper results, this being approximately the depth to which metal is hardened in the ordinary case-hardening process. In other cases a compression as high or even greater than fifteen one thousandths (.015) of an inch may be required to meet extreme conditions.

Having explained the nature and object of the invention, and having specifically described one way in which it may be applied, what is claimed is:

1. That improvement in the art of making piston parts for hydrocarbon motors which comprises forming a groove in a piston for the reception of a ring, forming a ring of greater width than the groove, compressing the opposite sides of the ring so that the ring will fit closely without binding in the groove and applying the ring to the groove.

2. That improvement in the art of making piston parts for hydrocarbon motors which comprises forming a groove in a piston for the reception of a ring, forming a ring of greater width than the groove, compressing the opposite side walls of the groove so that the ring will fit closely without binding in the groove and applying the ring to the groove.

3. That improvement in the art of making piston parts for hydrocarbon motors which comprises forming a groove in a piston for the reception of a ring, forming a ring of greater width than the groove, compressing the opposite sides of the ring and the opposite side walls of the groove so that the ring will fit closely without binding in the groove, and applying the ring to the groove.

4. That improvement in the art of making piston parts for hydrocarbon motors which comprises making a cast iron piston forming a groove in said piston for the reception of a ring, making a cast iron ring of greater width than the groove, compressing the opposite side walls of the groove and the opposite sides of the ring so that the ring will fit closely without binding in the groove and applying the ring to the groove.

5. That improvement in the art of making piston parts for hydrocarbon motors which comprises forming a cast iron piston ring and compressing the opposite sides of the ring to harden the same.

6. That improvement in the art of making piston parts for hydrocarbon motors which comprises forming a cast iron piston ring and hardening the opposite sides of the ring while the ring is cold.

7. That improvement in the art of making piston parts for hydrocarbon motors which comprises making a piston of cast iron, forming a groove in the piston for the reception of a ring and hardening the opposite side walls of the groove.

8. That improvement in the art of making piston parts for hydrocarbon motors which comprises making a piston of cast iron, forming a groove in the piston for the reception of a ring and compressing the opposite side walls of the groove to harden the same.

9. That improvement in the art of making piston parts for hydrocarbon motors which comprises making a piston of cast iron, forming a groove in the piston for the reception of a ring, and hardening the opposite side walls of the groove while the iron is cold.

10. A piston ring for hydrocarbon motors formed of cast iron and having its opposite sides hardened.

11. A piston ring for hydrocarbon motors made of cast iron and having its opposite sides compressed to harden the same.

12. A piston ring for hydrocarbon motors having its opposite sides hardened.

13. A piston for hydrocarbon motors made of cast iron and formed with a groove for the reception of a ring having its opposite side walls hardened.

14. A piston for hydrocarbon motors formed with a groove for the reception of a ring having its opposite side walls compressed to harden the same.

15. A piston for hydrocarbon motors having its body made of a certain material and formed with a groove having its opposite side walls also made of said material hardened to resist compaction and wear.

Signed at Wilkes-Barre, Pa., this 10th day of December, 1920.

BURTON S. COWLES.